United States Patent
Ohta et al.

(10) Patent No.: US 9,500,225 B2
(45) Date of Patent: Nov. 22, 2016

(54) SLIDING BEARING

(71) Applicant: TAIHO KOGYO Co., Ltd., Toyota-shi, Aichi (JP)

(72) Inventors: Motohiro Ohta, Toyota (JP); Yasuaki Goto, Toyota (JP); Kenji Touse, Toyota (JP)

(73) Assignee: TAIHO KOGYO CO., LTD., Toyota-Shi, Aichi (JP)

( * ) Notice: Subject to any disclaimer, the term of this patent is extended or adjusted under 35 U.S.C. 154(b) by 11 days.

(21) Appl. No.: 14/419,020

(22) PCT Filed: Jul. 29, 2013

(86) PCT No.: PCT/JP2013/070456
§ 371 (c)(1),
(2) Date: Feb. 2, 2015

(87) PCT Pub. No.: WO2014/021253
PCT Pub. Date: Feb. 6, 2014

(65) Prior Publication Data
US 2015/0219153 A1    Aug. 6, 2015

(30) Foreign Application Priority Data

Aug. 1, 2012 (JP) ................... 2012-171284

(51) Int. Cl.
*F16C 9/02* (2006.01)
*F16C 33/04* (2006.01)
(Continued)

(52) U.S. Cl.
CPC ............... *F16C 33/046* (2013.01); *F16C 9/02* (2013.01); *F16C 17/022* (2013.01); *F16C 33/14* (2013.01);
(Continued)

(58) Field of Classification Search
CPC ...... F16C 33/046; F16C 9/02; F16C 17/022; F16C 33/14
See application file for complete search history.

(56) References Cited

U.S. PATENT DOCUMENTS 2,821,444 A * 1/1958 Brown ...................... F16C 9/02
384/432
4,180,895 A * 1/1980 Spikes ................... B21D 53/10
29/413

(Continued)

FOREIGN PATENT DOCUMENTS

DE          4034804 A1    5/1991
JP          S54118380 A   9/1979

(Continued)

OTHER PUBLICATIONS

International Search Report corresponding to Application No. PCT/JP2013/070456; Date of Mailing: Oct. 8, 2013, with English translation.

(Continued)

*Primary Examiner* — Thomas R. Hannon
(74) *Attorney, Agent, or Firm* — Cantor Colburn LLP

(57) ABSTRACT

This sliding bearing comprises a pair of semicircular half bearings formed into a cylindrical shape by bringing both circumferential ends thereof into contact with each other. The axial width of the half bearings is narrower in both circumferential ends and the circumferential center, and wider in the quarter parts located therebetween. During manufacturing of the half bearings, finishing by cutting processing is first performed on the parts of a flat-plate material which after formation are to become the two axial-direction end faces and the two circumferential-direction end faces of the half bearings, and thereafter, the flat-plate material is deformed into a semicircle.

1 Claim, 4 Drawing Sheets

(51) Int. Cl.
*F16C 33/14* (2006.01)
*F16C 17/02* (2006.01)
*F16C 33/12* (2006.01)

(52) U.S. Cl.
CPC ......... *F16C 33/125* (2013.01); *F16C 2220/42* (2013.01); *F16C 2220/44* (2013.01); *F16C 2220/82* (2013.01); *F16C 2240/40* (2013.01); *F16C 2240/90* (2013.01); *Y10T 29/49671* (2015.01)

(56) References Cited

U.S. PATENT DOCUMENTS

| | | | |
|---|---|---|---|
| 5,153,991 | A | 10/1992 | Dickson et al. |
| 5,199,170 | A | 4/1993 | Mori et al. |
| 6,588,248 | B1 * | 7/2003 | Bickle ............... F16C 33/06 29/898.057 |
| 9,080,604 | B2 * | 7/2015 | Rossmanith ......... F16C 17/022 |
| 2010/0266228 | A1 * | 10/2010 | Pierotti Ferreira ....... F16C 9/00 384/275 |
| 2012/0114273 | A1 | 5/2012 | Grooteboer et al. |
| 2012/0304957 | A1 | 12/2012 | Watanabe |

FOREIGN PATENT DOCUMENTS

| | | |
|---|---|---|
| JP | S54163252 A | 12/1979 |
| JP | S60169421 U | 11/1985 |
| JP | S6236237 U | 3/1987 |
| JP | H1261515 A | 10/1989 |
| JP | H03133530 A | 6/1991 |
| JP | H08028570 A | 2/1996 |
| JP | 2011179572 A | 9/2011 |
| WO | 2010125026 A1 | 11/2010 |

OTHER PUBLICATIONS

Partial English translation of JPS54-118380A, Japanese Patent Application published Sep. 13, 1979.
Partial English translation of JPS54-163252A, Japanese Patent Application published Dec. 25, 1979.
Partial English translation of JPS60-169421U, Japanese Utility Model Patent Application published Nov. 9, 1985.
Partial English translation of JPS62-36237U, Japanese Utility Model Patent Application published Mar. 3, 1987.

* cited by examiner

SLIDING BEARING

CROSS REFERENCE TO RELATED APPLICATIONS

This is the U.S. national stage of application No. PCT/JP2013/070456, filed on Jul. 29, 2013. Priority under 35 U.S.C. §119(a) and 35 U.S.C. §365(b) is claimed from Japanese Application No. 2012-171284, filed Aug. 1, 2012, the disclosure of which is also incorporated herein by reference.

DESCRIPTION

1. Technical Field

The present invention relates to a sliding bearing and a manufacturing method thereof. In detail, the present invention relates to a sliding bearing that both peripheral ends of a pair of semicircular half bearings are contacted to each other so as to be formed cylindrically, and a manufacturing method thereof.

2. Background Art

Conventionally, a sliding bearing that peripheral ends of a pair of semicircular half bearings are contacted to each other so as to be formed cylindrically is known (Patent Literature 1).

In the case of manufacturing such a sliding bearing, a flat-plate material is deformed semicircular by press shaping, and subsequently, end surfaces of both axial ends and both peripheral ends of the semicircular material are cut so that a lateral width of the half bearing is made uniform and so-called finishing processing is performed.

PRIOR ART REFERENCE

Patent Literature

Patent Literature 1: the Japanese Patent Laid Open Gazette 2011-179572

DISCLOSURE OF INVENTION

Problems to be Solved by the Invention

Herein, in the sliding bearing of an engine for a car, magnitude of load applied to the sliding bearing from a rotating crankshaft is changed in each of parts along an axial direction corresponding to timing of explosion in a combustion chamber, and especially large load is applied to quarter parts positioned between both peripheral ends and a peripheral central part.

In contrast, in the conventional half bearing, since the width in the axial direction is uniform, the width must be set corresponding to the parts to which the large load is applied, whereby the width of the peripheral ends and the central part to which the large load is not applied is larger than a required width.

As a result, frictional resistance with the crankshaft caused by the large width is generated excessively at the peripheral ends and the central part, whereby problems such as deterioration of fuel efficiency are caused.

On the other hand, in a conventional manufacturing device of the sliding bearing, the flat-plate material is deformed semicircular and then finished by cutting processing, whereby it is difficult to change the width in the axial direction in each of parts.

In consideration of the above problems, the present invention provides a sliding bearing having suitable width in an axial direction corresponding to positons to which load is applied, and provides a manufacturing method which can manufacture the sliding bearing.

Means for Solving the Problems

According to the invention of claim 1, in a sliding bearing formed cylindrically by engaging both peripheral ends of a pair of semicircular half bearings with each other, an axial width of the half bearings is small in both peripheral ends and a peripheral central part and is large in a quarter part positioned therebetween, and end surfaces of both axial ends of the half bearings are finished by cutting processing.

According to the invention of claim 2, in a manufacturing method of a sliding bearing wherein flat-plate materials are deformed semicircular so as to manufacture semicircular half bearings and both peripheral ends of the half bearings are contacted to each other so as to shape these members cylindrically, parts of the flat-plate materials which are to be both axial end surfaces and both peripheral end surfaces of the half bearings after the deformation are finished by cutting processing previously, and subsequently, the flat-plate materials are deformed semicircular so as to manufacture the half bearings.

Effect of the Invention

According to the invention of claim 1, the quarter part to which large load is applied from the crankshaft is wide and the peripheral ends and the peripheral central part to which large load is not applied are narrow, whereby sliding resistance of these narrow parts can be reduced so as to improve fuel efficiency.

The end surfaces of the axial ends of the half bearings are finished by the cutting processing, whereby the present invention can use the sliding bearing having suitable axial width with the positions to which loads are applied.

According to the invention of claim 2, before the flat-plate materials are deformed semicircular, the parts of the flat-plate materials which are to be both axial end surfaces and both peripheral end surfaces of the half bearings are finished by the cutting processing previously, whereby any finishing processing is not required after the shaping and the sliding bearing can be obtained cheaply.

According to the invention, the sliding bearing having suitable axial width with the positions to which loads are applied like claim 1 can be manufactured.

DETAILED DESCRIPTION OF THE INVENTION

Figure 1:
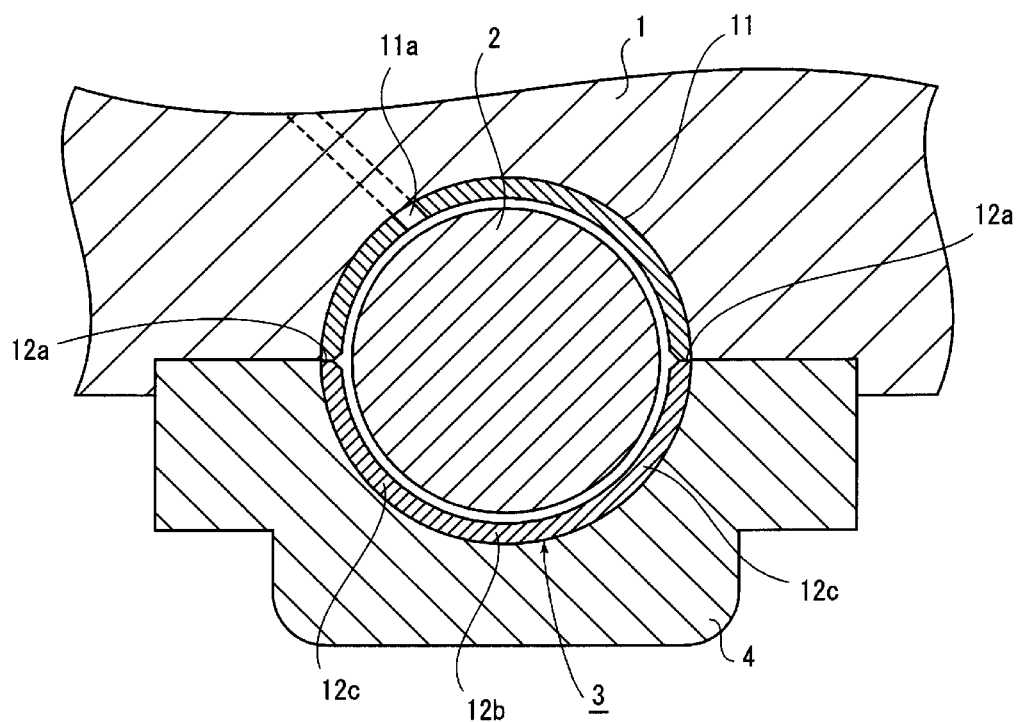
FIG. 1 is a sectional view of a sliding bearing according to this embodiment.

An embodiment shown in the drawings is explained. FIG. 1 is a sectional view of an essential part of an engine and shows a crankshaft 2 which is pivoted rotatably concerning a cylinder block 1 and a sliding bearing 3 which pivots the crankshaft 2 to the cylinder block 1.

A semicircular recess in which an upper side in the drawing of the sliding bearing 3 is housed is formed in the cylinder block 1, and a cap 4 in which a semicircular recess fixing the sliding bearing 3 to the cylinder block 1 is fixed to a lower part of the cylinder block 1 with bolts (not shown).

The sliding bearing 3 includes a pair of upper and lower semicircular half bearings 11 and 12 and is configured cylindrically by engaging peripheral ends of the half bearings 11 and 12 with each other.

A back plate made by metal such as stainless steel is formed in an outer peripheral surface of each of the half bearings 11 and 12. A sliding surface layer made by metal such as aluminum is laminated on an inner peripheral surface of the back plate (see FIG. 3), and fine slots are formed peripherally in a surface of the sliding surface layer.

In the sliding bearing 3, an oil supply hole 11a (when an oil groove is firmed along a peripheral direction, from the oil supply hole 11a via the oil groove) to a space between the sliding bearing 3 and the crankshaft 2.

Figure 2:
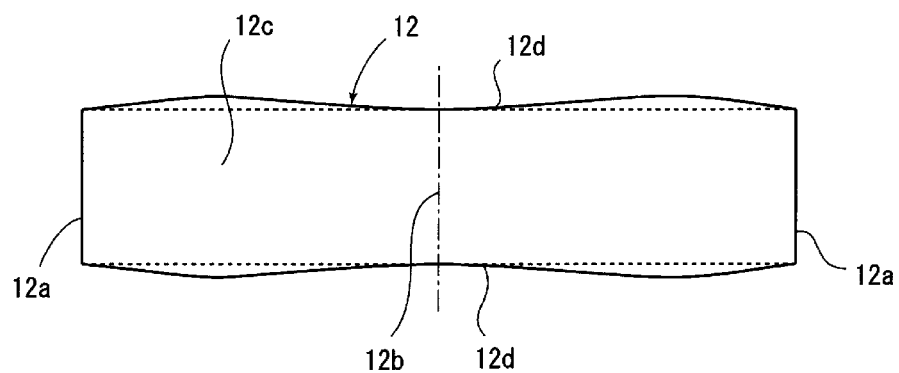
FIG. 2 is a development of a half bearing along a peripheral direction.

FIG. 2 is a drawing of the half bearing 12 of the side of the cap developed along a peripheral direction for explanation. Since the half bearing 11 of the side of the cylinder block 1 has substantially the same configuration as the half bearing 12 of the side of the cap 4, detailed explanation of the half bearing 11 is omitted.

As shown in FIG. 2, in the half bearing 12 of the sliding bearing 3 in this embodiment, widths of both peripheral ends 12a and a central part 12b are small and a width of quarter part 12c positioned therebetween is large. For example, the width of the quarter part 12c is larger than widths of the peripheral ends 12a and the central part 12b about 300 to 400 μm.

Both axial end surfaces 12d of the half bearing 12 are finished with cutting processing by a manufacturing method explained below. Namely, in this embodiment, the width of the half bearing 12 in an axial direction is uneven and the axial end surfaces of the half bearing 12 are finished.

Furthermore, a chamfered shape 12e (see FIG. 3) is formed in each of inner and outer peripheral surfaces of the half bearing 12.

The half bearings 11 and 12 configured as the above are combined and the engine is equipped with the sliding bearing 3 as shown in FIG. 1, whereby below effect can be obtained.

Firstly, a connecting rod whose tip is provided thereon with a piston is pivoted on the crankshaft 2 of the engine, and when explosion occurs in a combustion chamber hole in which the piston is housed, pressure of the explosion is applied to the crankshaft 2 via the piston and the connecting rod.

Large load generated by the explosion is applied to a contact surface with the sliding bearing 3 via the crankshaft 2. The large load is applied especially to the quarter part 12c of the half bearing 12 at the side of the cap 4.

Then, it is necessary that a connection range of the quarter part 12c with the crankshaft 2 is set large and an oil film between the crankshaft 2 and the sliding bearing 3 is secured so as to bear the large load.

On the other hand, the large load as the above is not applied to the peripheral ends 12a and the central part 12b of the half bearing 12, whereby sliding resistance between these parts and the crankshaft 2 is preferably reduced.

However, in the conventional half bearing, since the width in the axial direction is fixed, the widths of the peripheral ends and the central part must be set large corresponding to the width of the quarter part to which the large load is applied, whereby the sliding resistance of the peripheral ends and the central part is increased and fuel efficiency is worsened.

On the other hand, according to the sliding bearing 3 of this embodiment, the width of the quarter part 12c to which the large load is applied is large and the widths of the peripheral ends 12a and the central part 12b are small, whereby the sliding resistance can be reduced at the part to which the large load is not applied while securing enough oil film at the part to which the large load is applied.

Next, an explanation will be given on the manufacturing method of the sliding bearing 3 having the above configuration.

Firstly, a long and narrow material wound coil-like is supplied intermittently by a predetermined length at a time, and the long and narrow material is cut along a direction perpendicularly a lengthwise direction thereof, whereby a flat-plate material 21 which is strip-like shaped is obtained.

Figure 3:
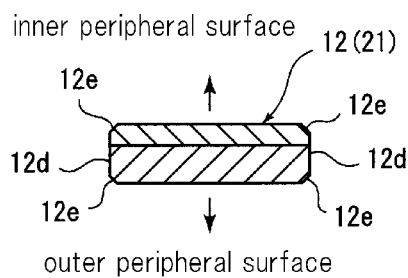
FIG. 3 is a sectional view of a flat-plate member.

Subsequently, as shown in FIG. 3, end surfaces of four sides of the flat-plate material 21 are cut, parts which are made into the axial end surfaces 12d and the peripheral end surfaces 12a are finished when the flat-plate material 21 is made into the half bearing 12.

At the time of the cutting processing of the flat-plate material 21, slant surfaces are formed at positions at the side of inner and outer peripheral surfaces of the half bearing 12 when the flat-plate material 21 is shaped into the half bearing 12, whereby the slant surfaces are made into the chamfered shapes 12e of the inner and outer peripheral surfaces of the half bearing 12 when the flat-plate material 21 is made into the half bearing 12.

By cutting the end surfaces of the flat-plate material 21 as the above, in the manufacturing method of the sliding bearing 3 according to the present invention, it is not necessary to cut the axial end surfaces of the half bearing 12 after the flat-plate material 21 is shaped into the half bearing 12, whereby cost of the processing can be reduced in comparison with the conventional manufacturing method that axial end surfaces of a material shaped semicircular are cut.

Figure 4:
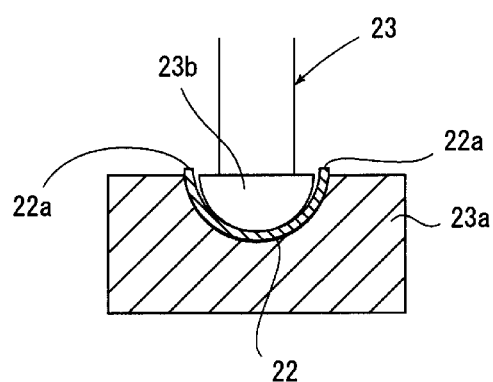
FIG. 4 is a sectional view of a first pressing means performing rough bending.

After the flat-plate material 21 is obtained as the above, rough bending that the flat-plate material is pressure-deformed into a semicircular material 22 with a first pressing means 23 shown in FIG. 4 is performed.

The first pressing means 23 includes a lower mold 23a in which a recess is formed and an upper mold 23b which presses the flat-plate material 21 downward so as to pinch it with the lower mold 23a and deform it into the semicircular material 22.

The first pressing means 23 does not compress both peripheral end surfaces 22a of the semicircular material 22 to be shaped and only deforms the flat-plate material 21 semicircular.

Figure 5:
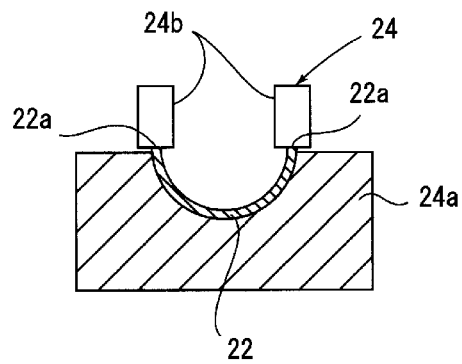
FIG. 5 is a sectional view of a second pressing means performing finish bending.

After obtaining the semicircular material 22 with the rough bending as the above, finish bending of the semicircular material 22 is performed with a second pressing means 24 shown in FIG. 5.

The second pressing means 24 includes a lower mold 24a in which a recess housing the semicircular material 22 is formed, and an upper mold 24b which presses the peripheral end surfaces 22a of the semicircular material 22 along the peripheral direction thereof.

In the finish bending process, by pressing the peripheral end surfaces 22a of the semicircular material 22 with the upper mold 24b, so-called coining is performed so as to maintain the semicircular material 22 at a fixed shape.

Subsequently, by cutting the inner peripheral surface of the semicircular material 22 obtained by the above process, the sliding surface layer with the crankshaft 2 is finished, whereby the half bearing 12 is obtained.

At this time, as mentioned above, the axial end surfaces 12d and the peripheral end surfaces 12a of the half bearing 12 are not cut.

When the flat-plate material 21 is shaped semicircular with the first pressing means and the second pressing means, the width of the quarter part 12c of the half bearing 12 is longer than the widths of the peripheral ends 12a and the central part 12b by extension of the material or the like, whereby the half bearing 12 mentioned above can be obtained. Since the axial end surfaces 12d are finished previously by the cutting processing before the above shaping, the half bearing 12 whose width in the axial direction is not uniform can be manufactured easily.

Figure 6:
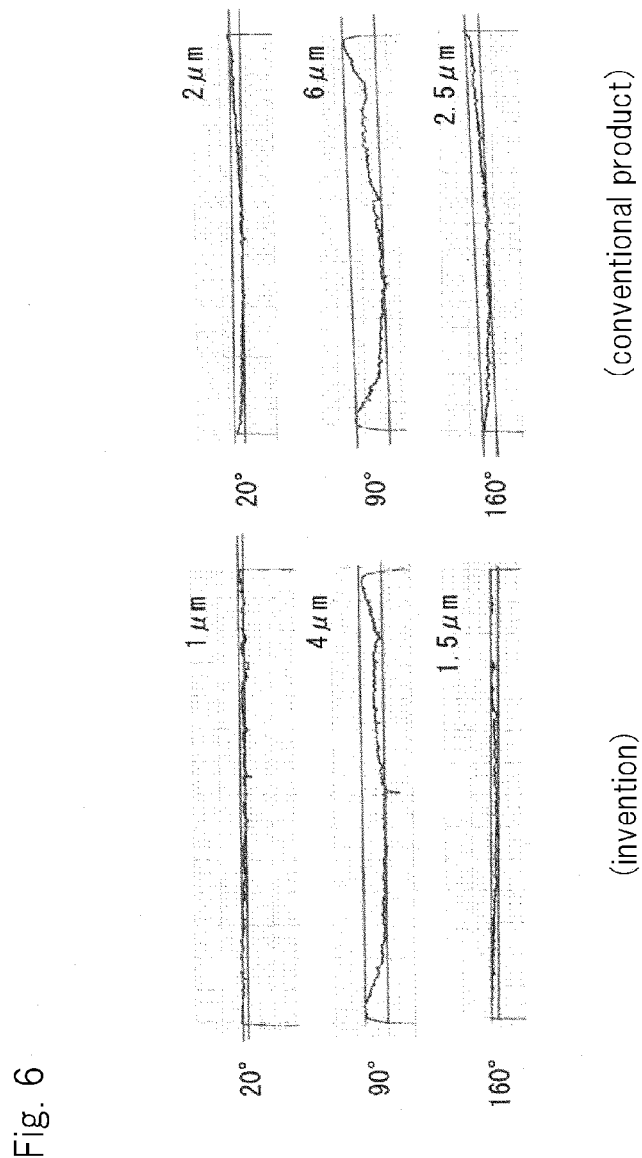
FIG. 6 is a diagram of results of an experiment.
Figure 7:
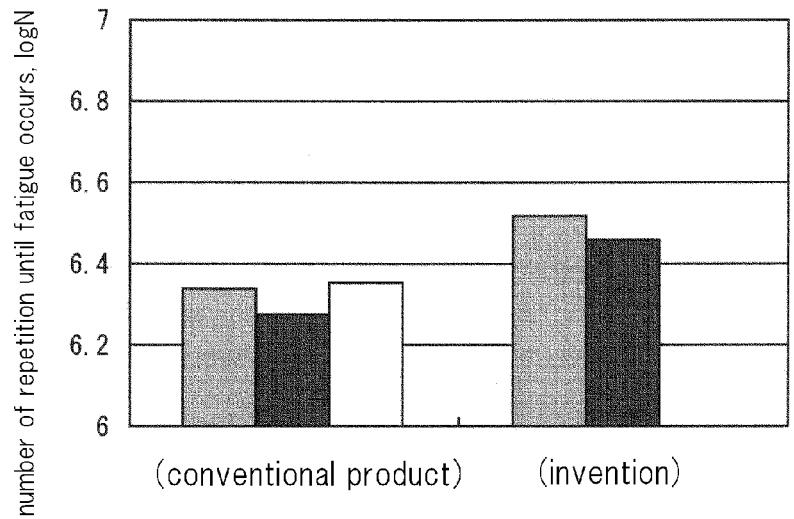
FIG. 7 is a diagram of results of an experiment.
Figure 8:
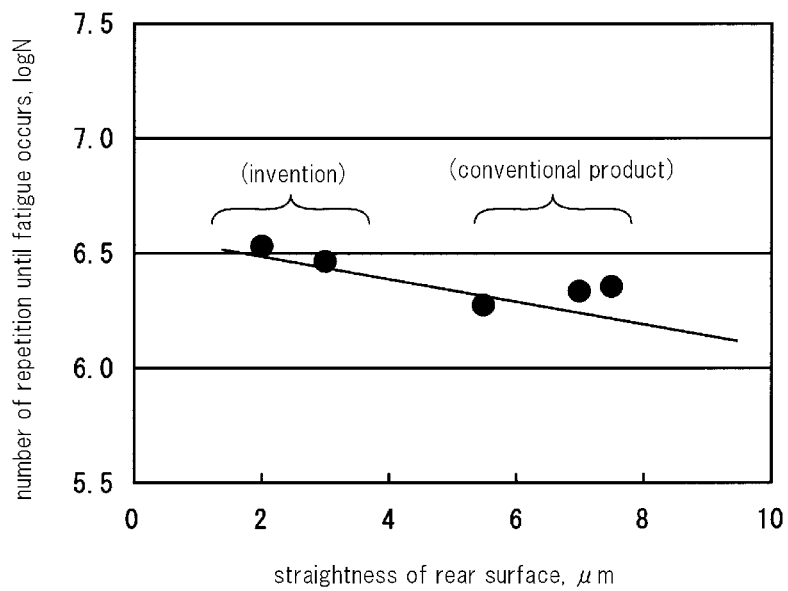
FIG. 8 is a diagram of results of the experiments.

FIGS. 6 to 8 show results of experiments concerning the sliding bearing 3 according to this embodiment, and comparative experiments of the half bearing 12 obtained by the manufacturing method according to the present invention (invention) with the half bearing of the conventional manufacturing method, that is, the half bearing whose axial end surfaces are cut and finished after deforming the flat-plate material semicircular (conventional product).

FIG. 6 is measurement of straightness of a rear surface at the side of the outer peripheral surface of the half bearing 12 of each of the invention and the conventional product. The straightness is measured at positions of 20°, 90° (the central part 12b) and 160° along the axial direction of the half bearing 12 concerning the center of the half bearing 12.

According to the results of the experiment, it is found that the invention has better straightness than the conventional product. That is guessed that the axial end surfaces are cut after the semicircular deformation in the conventional product, whereby internal stress accumulated in the material deformed semicircular is released and causes the bad straightness.

When the straightness of the rear surface of the half bearing 12 is good, adhesion with the cylinder block 1 and the cap 4 is improved and sludge and the like are prevented from entering a space therebetween, whereby load resistant is improved as shown by below results of the experiments.

FIG. 7 shows results of fatigue tests concerning reciprocating load of the invention and the conventional product. Two samples of the conventional product and three samples of the invention are tested.

As conditions of the experiment, instead of the crankshaft, a rotation shaft is pivoted by the sliding bearing 3 and rotated at 3000 rpm. Surface pressure of 57 MPa is applied intermittently from the rotation shaft to the sliding bearing 3 while temperature at the side of the rear surface of the sliding bearing 3 is maintained at 170° C. Then, number of repetition until the sliding bearing 3 is broken by fatigue is measured.

According to the results of the experiment, it is understood that the number of repetition of the invention is higher than that of the conventional product, whereby fatigue resistance of the invention is higher than that of the conventional product.

FIG. 8 shows correlation of the straightness of the rear surface of the sliding bearing 3 and the fatigue resistance of the sliding bearing 3 concerning the reciprocating load according to the result of the measurement of FIG. 6 and the result of the experiment of FIG. 7. A vertical axis shows the number of repetition until the fatigue occurs, and a horizontal axis shows the straightness of the rear surface of the peripheral central part 12b of the sample.

According to FIG. 8, it is understood that the sliding bearing 3 having the good straightness of the rear surface shows the higher fatigue resistance than the sliding bearing 3 having the bad straightness.

In the invention, the axial end surfaces 12d are finished previously by the cutting processing before the flat-plate material 21 is deformed semicircular, and any cutting processing is not performed after the deformation, whereby the sliding bearing 3 having the good straightness of the rear surface can be obtained easily.

On the other hand, the flat-plate material is shaped semicircular and then the axial end surfaces are cut as the conventional product, whereby the straightness of the rear surface is worsened and the fatigue resistance is worsened.

If the half bearing 12 whose width is changed with the positions is shaped semicircular and then the axial end surfaces 12d are obtained by the cutting processing conventionally, this cutting processing is difficult and the cost is increased.

INDUSTRIAL APPLICABILITY

According to the present invention, a sliding bearing having suitable widths with positions to which loads are applied can be obtained, thereby being useful industrially.

The invention claimed is:

1. A sliding bearing formed cylindrically by engaging both peripheral ends of a pair of semicircular half bearings with each other,
characterized in that
an axial width of the half bearings is smaller in both peripheral ends and a peripheral central part and is larger in a quarter part positioned therebetween, and end surfaces of both axial ends of the half bearings are finished by cutting processing.

* * * * *